United States Patent
Aoki et al.

(10) Patent No.: US 10,075,837 B2
(45) Date of Patent: Sep. 11, 2018

(54) COMMUNICATION APPARATUS, CONTROL METHOD, AND COMPUTER-READABLE STORAGE MEDIUM

(71) Applicant: CANON KABUSHIKI KAISHA, Tokyo (JP)

(72) Inventors: Hitoshi Aoki, Kawasaki (JP); Atsufumi Mogi, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 86 days.

(21) Appl. No.: 15/265,200

(22) Filed: Sep. 14, 2016

(65) Prior Publication Data
US 2017/0094497 A1 Mar. 30, 2017

(30) Foreign Application Priority Data
Sep. 24, 2015 (JP) .................. 2015-187445

(51) Int. Cl.
*H04L 12/28* (2006.01)
*H04W 8/00* (2009.01)
(Continued)

(52) U.S. Cl.
CPC .......... *H04W 8/005* (2013.01); *H04L 67/16* (2013.01); *H04L 67/28* (2013.01);
(Continued)

(58) Field of Classification Search
CPC .. H04W 8/005; H04W 72/0446; H04L 67/28; H04L 67/16
(Continued)

(56) References Cited

U.S. PATENT DOCUMENTS 8,964,631 B2  2/2015  Aoki
2009/0286466 A1* 11/2009 Kim ................. H04H 60/51
455/3.02
(Continued)

OTHER PUBLICATIONS

Hsieh, Jing-Rong, "Message flows for local network service discovery," 11-14-0643-00-00aq-message-flows-for-local-network-service-discovery, IEEE Draft, 11-14-0643-00-00aq-message-flows-for-local-network-service-discovery, IEEE-SA, Mentor, Piscataway, NJ, USA, vol. 802.11aq, May 13, 2014 (May 13, 2014), pp. 1-14, XP068069346, [retrieved on May 13, 2014].
(Continued)

*Primary Examiner* — Chi H Pham
*Assistant Examiner* — Alexander O Boakye
(74) *Attorney, Agent, or Firm* — Carter, DeLuca, Farrell & Schmidt, LLP

(57) ABSTRACT

A communication apparatus has a communication function capable of transmitting/receiving a wireless signal to/from another communication apparatus during a period of a predetermined length which comes at a predetermined time interval, and can execute at least one of transmission processing and reception processing of the wireless signal during the period as a proxy of another apparatus. In accordance with whether to execute the processing as the proxy, the communication apparatus sets a frequency at which the communication apparatus enters in a state in which the wireless signal can be transmitted/received during the periods.

15 Claims, 9 Drawing Sheets

(51) Int. Cl.
  *H04L 29/08*   (2006.01)
  *H04W 52/02*  (2009.01)
  *H04W 72/04*  (2009.01)
  *H04W 48/12*  (2009.01)
  *H04W 4/20*   (2018.01)

(52) U.S. Cl.
  CPC ... *H04W 52/0216* (2013.01); *H04W 72/0446* (2013.01); *H04W 4/20* (2013.01); *H04W 48/12* (2013.01); *Y02D 70/00* (2018.01); *Y02D 70/142* (2018.01)

(58) Field of Classification Search
  USPC ........................................................ 370/254
  See application file for complete search history.

(56) References Cited

U.S. PATENT DOCUMENTS

| | | |
|---|---|---|
| 2014/0269555 A1 | 9/2014 | Sadasivam et al. |
| 2014/0302787 A1 | 10/2014 | Rantala et al. |
| 2015/0245317 A1 | 8/2015 | Aoki |
| 2015/0245399 A1 | 8/2015 | Aoki |
| 2015/0245400 A1 | 8/2015 | Aoki |
| 2016/0278082 A1 | 9/2016 | Aoki |

OTHER PUBLICATIONS

European Search Report dated Feb. 20, 2017, in corresponding European Patent Application No. 16001707.5, 9 pages.

\* cited by examiner

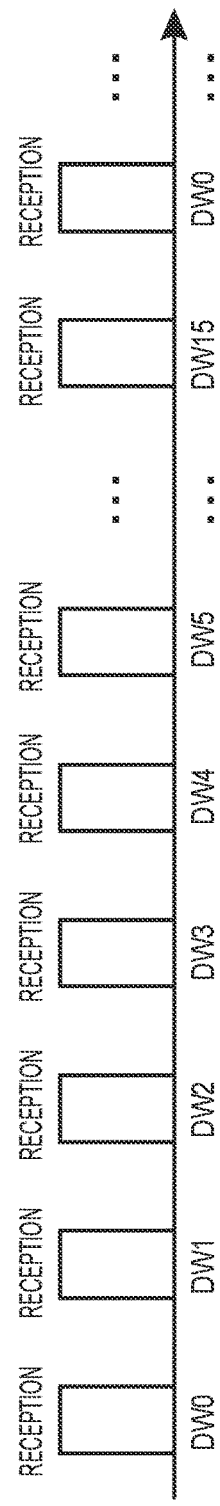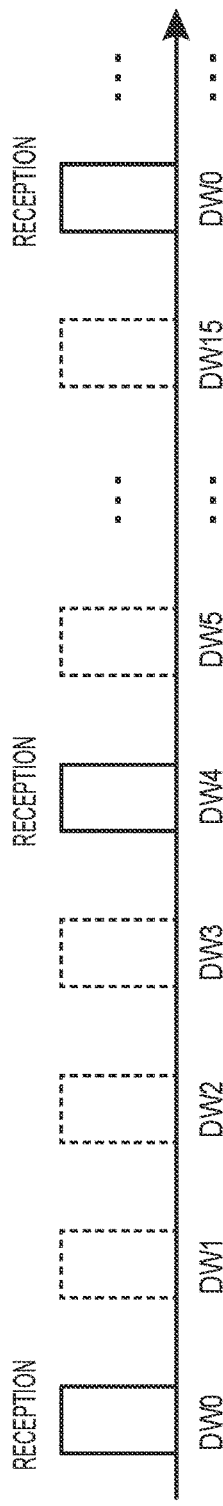

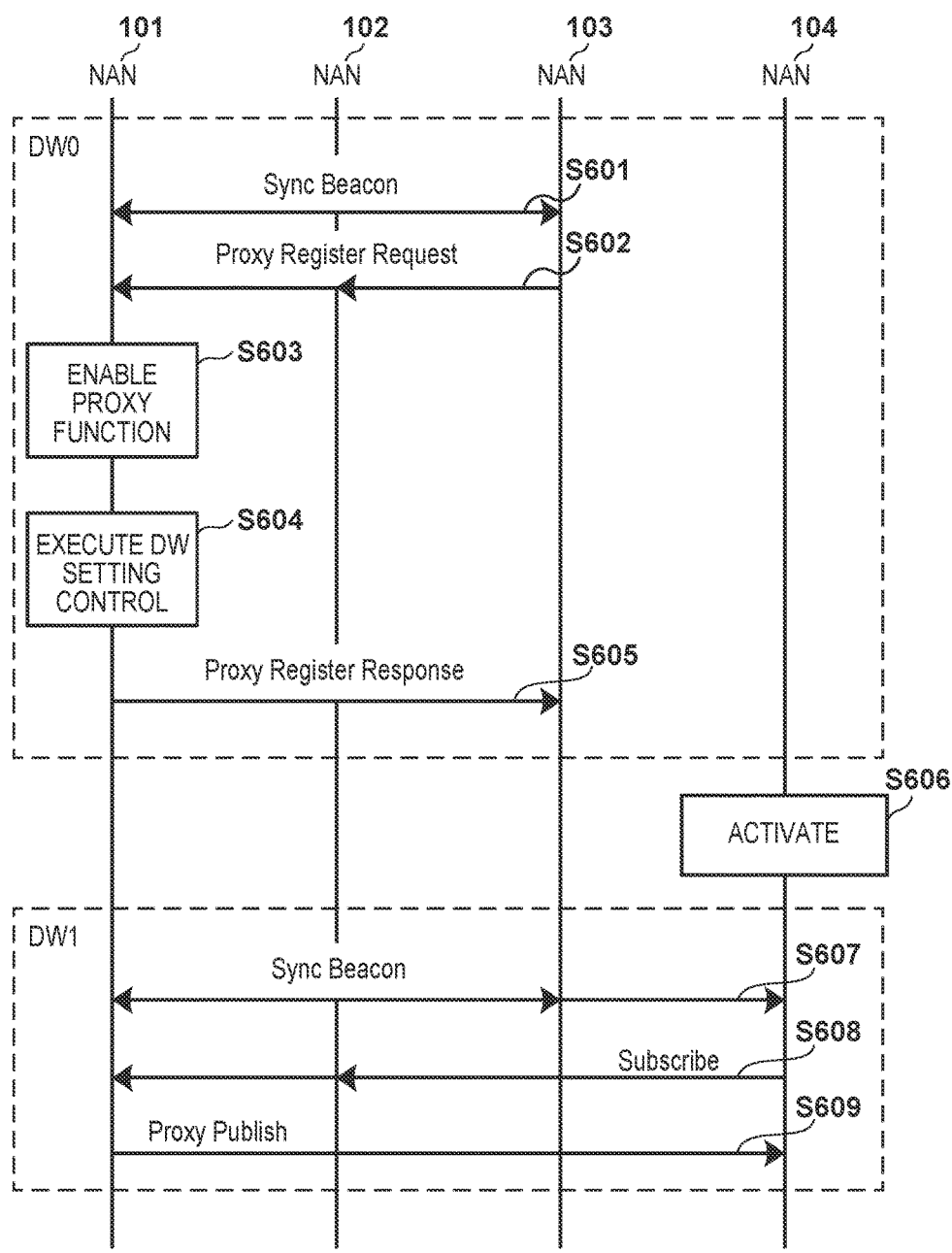

F I G. 11
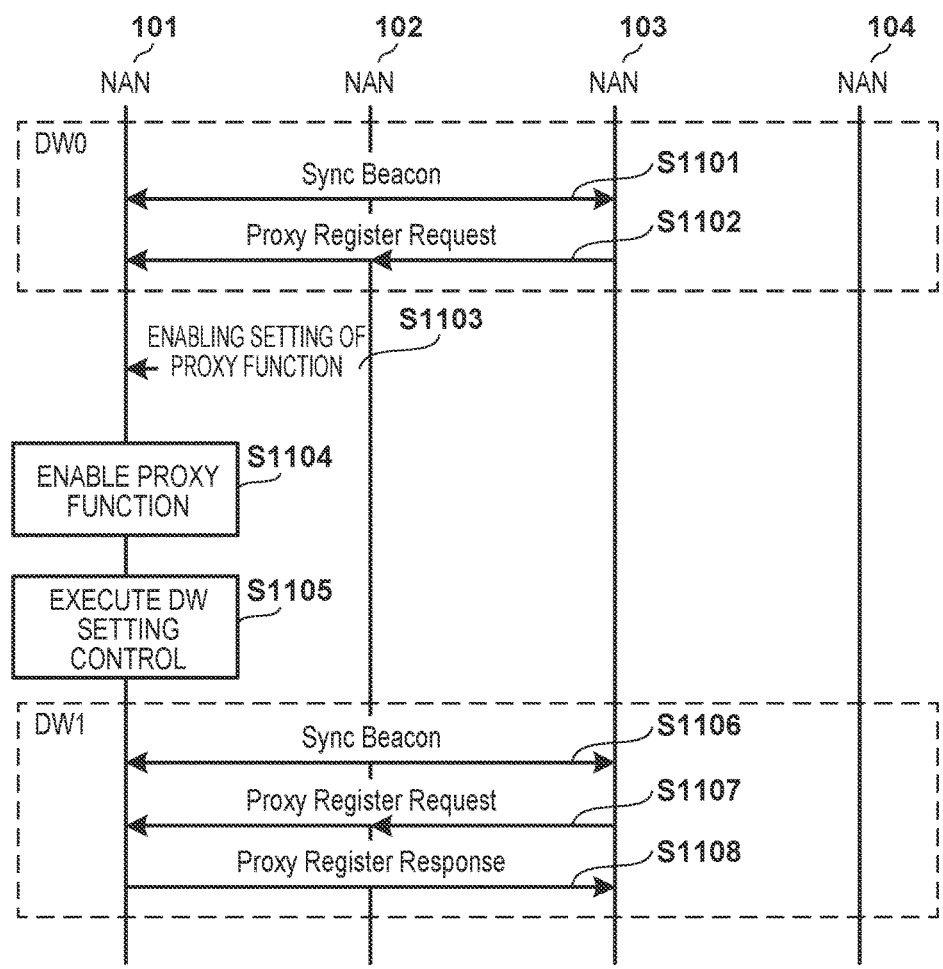

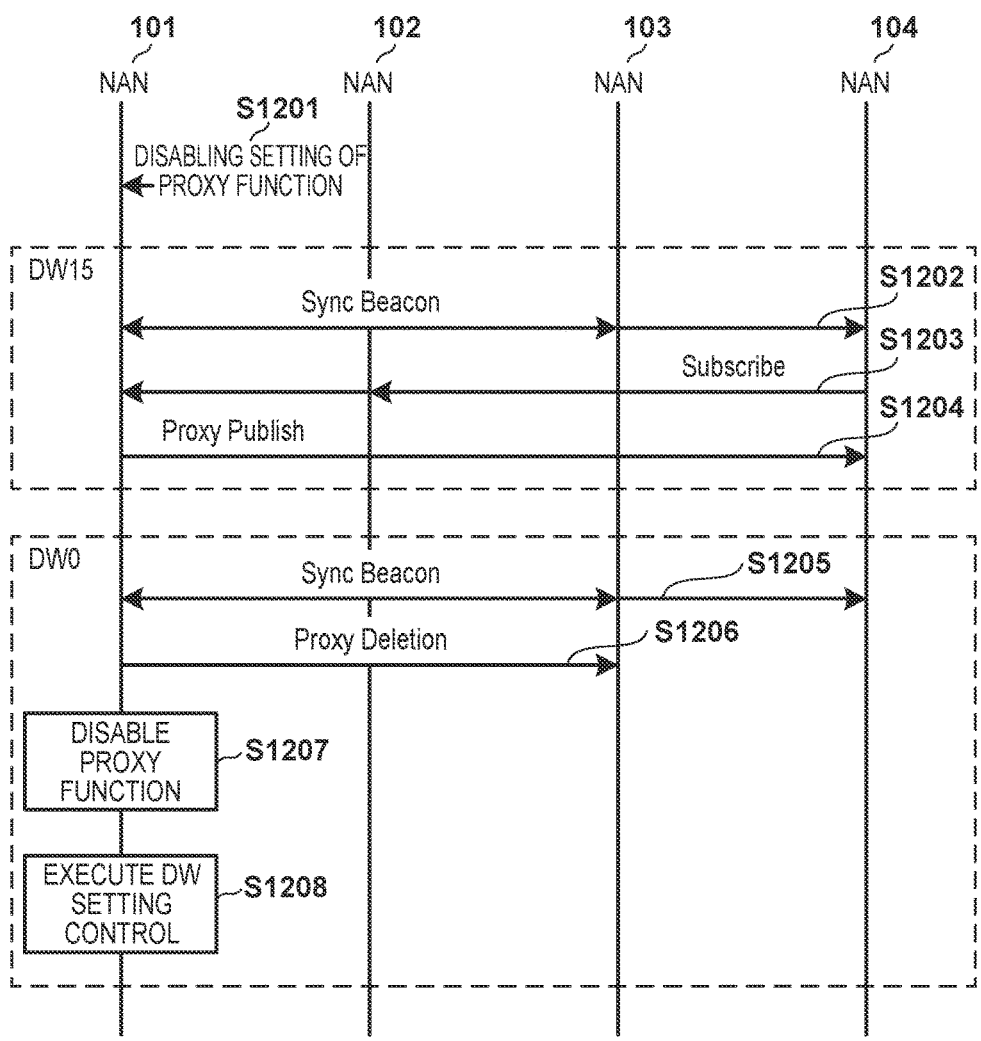

COMMUNICATION APPARATUS, CONTROL METHOD, AND COMPUTER-READABLE STORAGE MEDIUM

BACKGROUND OF THE INVENTION

Field of the Invention

The present invention relates to a technique of recognizing another communication apparatus in a communication apparatus.

Description of the Related Art

In recent years, a wireless LAN represented by the IEEE802.11 standard series has been widely used. In the wireless LAN, a base station called an access point (AP) often controls a network. A wireless network is formed by the AP and stations (STAs) which fall within the radio wave coverage of the AP and are in a wirelessly connected state.

Furthermore, products and standards for various network forms of the wireless LAN have appeared on the market, in addition to this conventional simple wireless network configuration of the AP and STAs. U.S. Patent Application Publication No. 2014/0302787 describes NAN (Neighbor Awareness Networking) which has been defined by Wi-Fi Alliance as a standard for discovering a communication apparatus and a service provided by it with low power consumption. This is intended to reduce the power consumption when a communication apparatus synchronizes with another communication apparatus in terms of a period during which information is exchanged with the other communication apparatus, and thus shortens the time during which a wireless RF (Radio Frequency) part is enabled. This synchronization period in NAN is called a DW (Discovery Window). A set of NAN devices which share a predetermined synchronization period is called a NAN cluster. Among the NAN devices, terminals respectively having a master role or a non-master sync role transmit sync beacons as signals for ensuring the synchronization between the terminals during the DW period. The NAN device establishes synchronization with another terminal, and then transmits/receives a subscribe message as a signal for discovering a service, a publish message as a signal for sending a notification of provision of a service, and the like during the DW period. Furthermore, the NAN device can transmit/receive a follow-up message for exchanging additional information about a service during the DW period. On the other hand, the NAN device can enter a DOZE state as a state in which no wireless signal is received during the DW period, thereby reducing the power consumption.

The appearance frequency of DW periods during which a NAN device receives wireless signals depends on the NAN device but all NAN devices joining a NAN cluster need to receive wireless signals during a special DW period called DW0. DW0 indicates a DW period which comes once every 16 DW periods. Furthermore, DW0 indicates a DW period which starts when the lower 23 bits of a TSF (Time Synchronization Function) as a counter timer used by the NAN cluster for synchronization are 0×0. The NAN devices respectively operating in a master role or a non-master sync role need to transmit synch beacons for every DW period, and can thus receive wireless signals during all the DW periods.

If a NAN device is in the DOZE state during a DW period, it cannot transmit/receive a subscribe message and publish message during that period. This poses a problem that a period until another apparatus discovers a service provided by a NAN device which often enters the DOZE state during DW periods is prolonged.

The present invention provides a technique for shortening a period until a communication apparatus discovers another apparatus and a service provided by it.

SUMMARY OF THE INVENTION

According to one aspect of the present invention, there is provided a communication apparatus comprising: a communication unit configured to transmit/receive a wireless signal to/from another communication apparatus during a period of a predetermined length which comes at a predetermined time interval; an execution unit configured to execute at least one of transmission processing and reception processing of the wireless signal during the period as a proxy of another apparatus; and a setting unit configured to set, in accordance with whether the execution unit executes the processing, a frequency at which the communication apparatus enters in a state in which the communication unit can transmit/receive the wireless signal during the periods.

According to another aspect of the present invention, there is provided a communication apparatus comprising: a communication unit configured to communicate service information during discovery windows of Neighbor Awareness Networking; an execution unit configured to execute processing of proxy-transmitting service information of another apparatus during the discovery windows; and a setting unit configured to set the communication unit during the discovery windows so that a frequency, when the execution unit does not execute the processing, at which the communication unit is set in a state in which no wireless communication is performed during the discovery windows is lower than that, when the execution unit executes the processing, at which the communication unit is set in the state in which no wireless communication is performed during the discovery windows.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIGS. 5A and 5B are timing charts each showing the relationship between DW periods and signal transmission/reception timings;

FIG. 6 is a sequence chart showing the first example of the procedure of proxy request processing;

FIG. 11 is a sequence chart showing the second example of the procedure of proxy request processing; and FIG. 12 is a sequence chart showing the second example of the procedure of proxy request stop processing.

DESCRIPTION OF THE EMBODIMENTS

Figure 1:
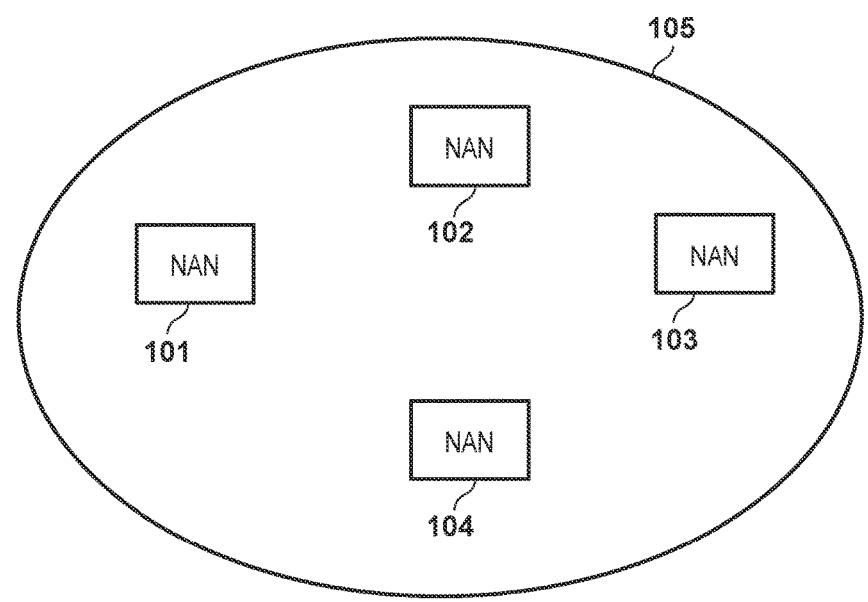
FIG. 1 is a view showing an example of the configuration of a wireless communication system.

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

The following description assumes that each communication apparatus is a terminal having the wireless LAN communication function complying with the IEEE802.11 standard series. The present invention, however, is not limited to this. Furthermore, although each communication apparatus to be described below is a NAN device capable of discovering, by Wi-Fi Alliance Neighbor Awareness Networking (NAN), another communication apparatus and a service provided by it, the present invention is not limited to this. That is, in the following description, technical terms corresponding to a predetermined standard are used. However, each discussion to be described below is applicable to other standards of the same type.

NAN will now be described. In NAN, service information is communicated during a period called a discovery window (DW). The DW indicates the convergence time and channel of a plurality of devices for executing NAN. A set of terminals which share the schedule of DWs is called a NAN cluster.

Each terminal belonging to the NAN cluster operates in one of master, non-master sync, and non-master non-sync roles. The terminal operating in the master role transmits a synchronization beacon (sync beacon) as a beacon for causing each terminal to identify the DW and synchronize with it. In addition, the terminal operating in the master role transmits a discovery beacon as a signal for causing a terminal, which does not belong to the NAN cluster, to recognize the NAN cluster. The discovery beacon is transmitted even during a period other than the DW periods for, for example, every 100 TUs (Time Units) (1 TU corresponds to 1,024 μsec). Note that at least one terminal in each NAN cluster operates in the master role.

The terminal operating in the non-master sync role transmits not a discovery beacon but a sync beacon. The terminal operating in the non-master non-sync role transmits neither a sync beacon nor a discovery beacon.

In accordance with the sync beacon, the terminal joining the NAN cluster communicates service information during the DW period in synchronous with the DW period set in every predetermined cycle.

The terminals communicate, with each other, a subscribe message as a signal for discovering a service and a publish message as a signal for sending a notification of provision of a service during the DW period. Furthermore, the respective terminals can exchange follow-up messages for exchanging additional information about a service during the DW period. Note that the publish, subscribe, and follow-up messages will be collectively referred to as service discovery frames (SDFs) hereinafter. The respective terminals can advertise or detect the service by exchanging the SDFs.

As described above, the NAN device can suppress the power consumption even during the DW period by entering the DOZE state as a state in which no wireless signal is transmitted/received. On the other hand, the NAN device cannot transmit/receive the subscribe and publish messages during the DW period when it is in the DOZE state. This may prolong the period until another NAN device discovers a service provided by the NAN device.

To cope with this, some NAN devices can request another NAN device to perform service search and notification processes such as subscribe and publish processes. A NAN device which proxy-executes the service search and notification processes of another NAN device will be referred to as a proxy server hereinafter. A NAN device which requests another NAN device to serve as a proxy will be referred to as a proxy client hereinafter. If the proxy client requests the proxy server to proxy-transmit service information, the proxy server proxy-transmits the service information of the proxy client. When the proxy server executes service search and notification processes instead of the proxy client, the proxy client can significantly reduce the power consumption by entering the DOZE state during a longer period. Even if a NAN device which is searching for a service provided by the proxy client transmits a subscribe message while the proxy client is in the DOZE state, the proxy server may return a response. This increases the probability that the NAN device which is searching for the service can discover the service provided by the proxy client even if the proxy client is in the DOZE state.

However, even if the proxy client requests proxy-execution of service search and notification processes, if the proxy server which has received the request often enters the DOZE state, the period during which the proxy server proxy-executes the service search and notification processes of the proxy client is unwantedly shortened. As a result, the time until the NAN device which is searching for the service discovers the service of the proxy client may be prolonged.

Therefore, in this embodiment, the NAN device performs control to shift to the DOZE state in accordance with whether it currently operates as the proxy server to proxy-execute the service search and notification processes of another NAN device. That is, the NAN device currently operating as the proxy server performs control to prevent itself from often shifting to the DOZE state. After a description of the configuration of a wireless communication system and the arrangement of a communication apparatus, which are common to the respective embodiments, a processing procedure according to each embodiment will be described.

(Configuration of Wireless Communication System)

An example of the configuration of a wireless communication system according to this embodiment will be described with reference to FIG. 1. The wireless communication system according to this embodiment is formed by including NANs 101 to 104 as communication apparatuses (NAN devices) each complying with the NAN standard, and the NANs 101 to 104 join a NAN cluster 105. The NAN devices (NANs 101 to 104) joining the NAN cluster 105 creates a network using frequency channel 6 (6 ch). The NAN cluster 105 is a NAN cluster in which the length of each DW period is 16 TUs, and the time interval from the start timing of a DW period to that of the next DW period is 512 TUs. The DW periods have a cycle of 16 DW periods of DW0 to DW15. A DW period 16 DW periods after DWn (n is an integer of 0 to 15) is also DWn. Assume that all the NAN devices joining the NAN cluster 105 respectively receive wireless signals during DW0 without exception.

The NAN 101 is a communication apparatus capable of executing each process to be described below. Based on the NAN standard, the NAN 101 can discover nearby communication apparatuses and services provided by them, and provide information of a service which can be provided by itself. The NAN 101 can operate as a proxy server which can proxy-execute the service search and notification processes of another NAN device. Assume that the NAN 101 joins the NAN cluster 105 in the non-master non-sync role. The NAN 101 has a state in which it receives wireless signals during DW0, DW4, DW8, and DW12 and a state in which it receives wireless signals during all the DW periods. Note that DWn (n=0, . . . , 15) represents a DW period which starts when a period of 512×n [TUs] elapses after the start of DW0 with reference to DW0. Furthermore, DW16 corresponds to next DW0.

The NAN 102 is a communication apparatus joining the NAN cluster 105 in the master role. The NAN 102 receives wireless signals during all the DW periods, and transmits sync beacons during all the DW periods. The NAN 103 is a communication apparatus joining the NAN cluster 105 in the non-master non-sync role. The NAN 103 transmits/receives a wireless signal during only DW0. Assume that the NAN 103 is a publisher which provides a predetermined service which the NAN 104 is searching for. The NAN 104 is a communication apparatus joining the NAN cluster 105 in the non-master non-sync role. Assume that the NAN 104 is a subscriber which is searching for the predetermined service provided by the NAN 103. Note that each of the NANs 101 to 104 enters the DOZE state without supplying power to a communication unit during a DW period when no wireless signal is transmitted/received.

(Arrangement of NAN 101)

Figure 2:
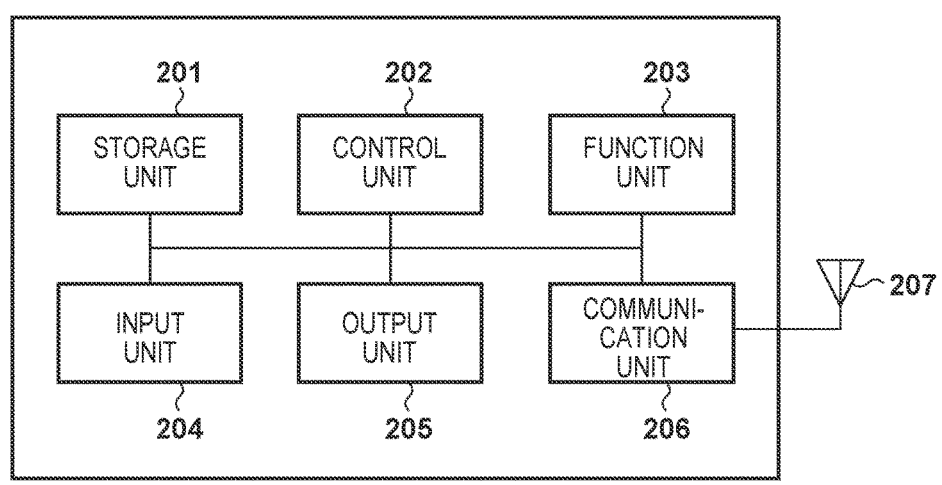
FIG. 2 is a block diagram showing an example of the hardware arrangement of a NAN 101.

FIG. 2 shows the hardware arrangement of the NAN 101 according to this embodiment. The NAN 101 includes, as an example of a hardware arrangement, a storage unit 201, a control unit 202, a function unit 203, an input unit 204, an output unit 205, a communication unit 206, and an antenna 207.

The storage unit 201 is formed by one or both of a ROM and a RAM, and stores programs for executing various operations (to be described later), and various kinds of information such as communication parameters for wireless communication. Note that instead of the memory such as the ROM or RAM, a storage medium such as a flexible disk, hard disk, optical disk, magnetooptical disk, CD-ROM, CD-R, magnetic tape, nonvolatile memory card, or DVD may be used as the storage unit 201.

A control unit 202 is formed by a CPU or MPU, and controls the overall NAN 101 by executing the programs stored in the storage unit 201. Note that the control unit 202 may control the overall NAN 101 in cooperation with an OS (Operating System) and the programs stored in the storage unit 201.

The control unit 202 controls the function unit 203 to execute predetermined processing such as image capturing, printing, and projection. The function unit 203 is hardware used by the NAN 101 to execute predetermined processing. If, for example, the NAN 101 is a camera, the function unit 203 serves as an image capturing unit, and performs image capturing processing. If, for example, the NAN 101 is a printer, the function unit 203 serves as a printing unit, and performs print processing. If, for example, the NAN 101 is a projector, the function unit 203 serves as a projection unit, and performs projection processing. Data processed by the function unit 203 may be data stored in the storage unit 201 or data communicated with another NAN via the communication unit 206 (to be described later).

The input unit 204 accepts various operations from the user. The output unit 205 performs various kinds of output operations to the user. The output from the output unit 205 includes at least one of display on a screen, a voice output from a loudspeaker, a vibration output, and the like. Note that both of the input unit 204 and the output unit 205 may be implemented by one module like a touch panel.

The communication unit 206 controls wireless communication complying with the IEEE802.11 standard series, and controls IP communication. The communication unit 206 controls the antenna 207 to transmit/receive a wireless signal for wireless communication. The NAN 101 communicates a content such as image data, document data, or video data with another communication apparatus via the communication unit 206.

Figure 3:
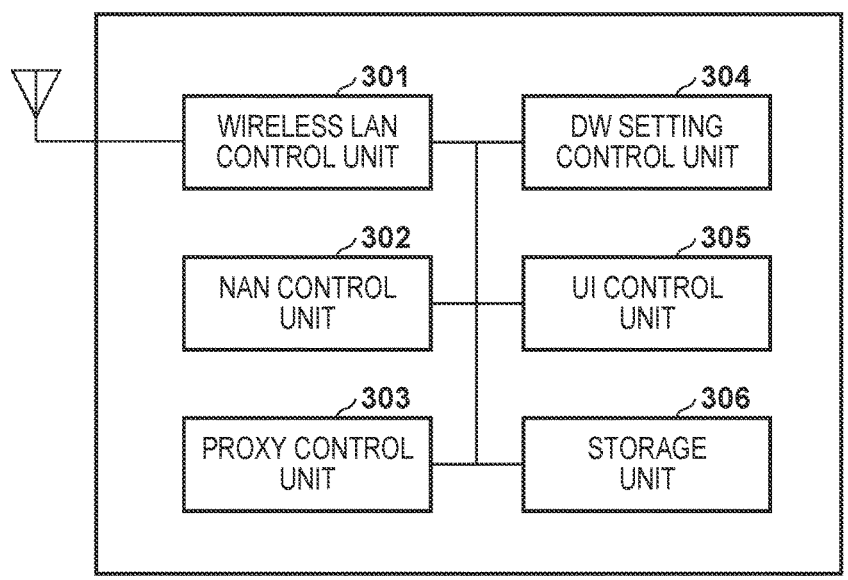
FIG. 3 is a block diagram showing an example of the functional arrangement of the NAN 101.

FIG. 3 is a block diagram showing an example of the functional arrangement of the NAN 101. The NAN 101 includes, as a functional arrangement, for example, a wireless LAN control unit 301, a NAN control unit 302, a proxy control unit 303, a DW setting control unit 304, a UI control unit 305, and a storage unit 306.

The wireless LAN control unit 301 is formed by including an antenna for transmitting/receiving a wireless signal to/from another wireless LAN apparatus, a circuit, and a program for controlling the antenna and circuit. The wireless LAN control unit 301 executes wireless LAN communication control in accordance with the IEEE802.11 standard series. The NAN control unit 302 is formed by including hardware and a program for performing control in accordance with the NAN standard. The proxy control unit 303 controls the NAN control unit 302 to implement a proxy function of proxy-executing the service search and notification processes of another NAN device. The DW setting control unit 304 is a control unit for deciding a DW period during which the NAN 101 transmits/receives a wireless signal. Detailed processing of the DW setting control unit 304 will be described later. The UI control unit 305 is formed by including hardware related to a user interface such as a touch panel or button for accepting an operation for the NAN 101 by the user (not shown) of the NAN 101, and a program for controlling the hardware. Note that the UI control unit 305 also has, for example, a function for presenting information to the user, such as a function of displaying an image or the like or a function of outputting a voice. The storage unit 306 is a storage device which can be formed by a ROM, a RAM, and the like and saves data and programs operated by the NAN 101.

(Processing Procedure)

Some embodiments of a processing procedure executed by the NAN 101, a sequence in the wireless communication system, and the like will be described.

<First Embodiment>

In this embodiment, a NAN 101 determines whether it operates as the proxy server of another communication apparatus (NAN device). If the NAN 101 operates as the proxy server for proxy-transmitting the service information of the other communication apparatus, it receives wireless signals during all the DW periods. On the other hand, if the NAN 101 does not operate as the proxy server for proxy-transmitting the service information of the other communication apparatus, it performs control to receive wireless signals during only some of the DW periods. To decrease the frequency at which the NAN 101 enters the DOZE state when the NAN 101 operates as the proxy server, another apparatus is made to be able to quickly recognize the service information of an apparatus which has requested the NAN 101 to proxy-transmit the service information.

Figure 4:
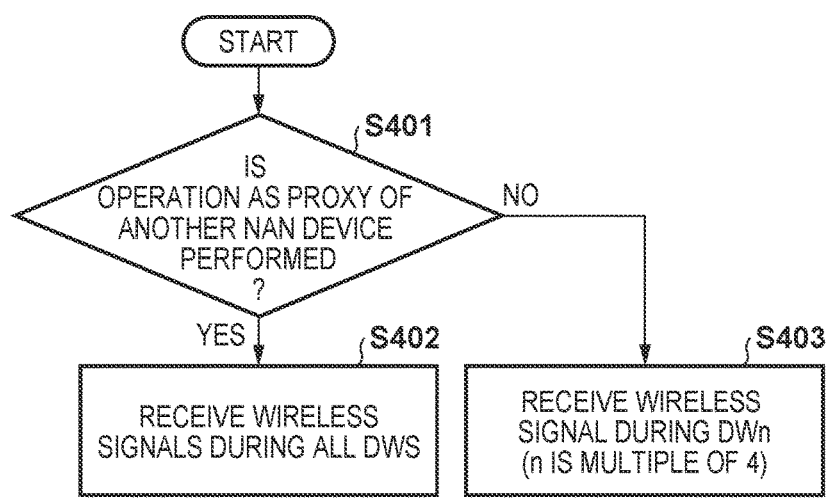
FIG. 4 is a flowchart illustrating the first example of the procedure of DW setting control processing.

FIG. 4 is a flowchart illustrating an example of a processing procedure executed by a DW setting control unit 304 in the NAN 101. This processing is executed when the NAN 101 receives a proxy register request or a proxy deletion request from another NAN device joining a NAN cluster 105. Note that by transmitting a publish signal, the NAN 101 notifies the other NAN device that it can operate as the proxy server. If the NAN 101 has a role of transmitting a beacon signal, it may transmit a beacon containing information indicating that it can operate as the proxy server.

Upon start of the processing, the NAN 101 determines whether it has received a proxy register request from the other NAN device (step S401). If the NAN 101 has received the proxy register request from the other NAN device (YES in step S401), it controls a NAN control unit 302 to receive wireless signals during all the DW periods (step S402); otherwise, (NO in step S401), it controls the NAN control unit 302 to receive a wireless signal during DWn where n is a multiple of 4, that is, every four DW periods (step S403). In this case, the NAN 101 controls not to receive wireless signals during DW periods other than DWn where n is a multiple of 4. Note that the NAN 101 controls not to receive wireless signals during the DW periods other than DWn where n is a multiple of 4. However, n may be an arbitrary numeral.

FIGS. 5A and 5B are timing charts schematically showing the wireless signal reception states of the NAN 101 in steps S402 and S403, respectively. FIG. 5A corresponds to the case of step S402, and shows a state in which wireless signals are received during all the DW periods. In this case, the NAN 101 enables the reception circuit of a wireless LAN control unit 301 during all the DW periods, that is, DW0 to DW15, thereby receiving wireless signals. This can increase the probability that the NAN 101 can receive a wireless signal from the other NAN device. When a wireless signal is received, the NAN 101 can quickly respond to the wireless signal.

On the other hand, FIG. 5B corresponds to the case of step S403, and shows a state in which the NAN 101 receives a wireless signal during DWn where n is a multiple of 4, that is, during only DW0, DW4, DW8, and DW12. In this case, since the NAN 101 receives no wireless signal during DW1, DW2, DW3, or the like, the frequency at which the NAN 101 receives wireless signals during the DW periods decreases, and thus the power consumption can be reduced. However, the NAN 101 cannot receive a wireless signal transmitted from the other NAN device during DW1, DW2, DW3, or the like, and cannot quickly respond to the wireless signal.

Subsequently, a sequence when the NAN 101 receives a proxy register request will be described with reference to FIG. 6. Note that at the start of the processing of FIG. 6, the NAN 101 has not received a proxy transmission request from another NAN device, and does not operate as the proxy server. Thus, the NAN 101 can receive a wireless signal during only the period of DWn where n is a multiple of 4 in accordance with the flowchart of FIG. 4.

A processing procedure during DW0 will be described first. During this DW period, a NAN 102 having the master role of the NAN cluster 105 transmits a sync beacon (step S601). The sync beacon is a frame defined by the NAN standard, and is a signal used by the communication apparatuses joining the NAN cluster 105 to synchronize with each other. The sync beacon can contain time information and information for identifying the NAN cluster. The sync beacon is broadcast.

Subsequently, a NAN 103 broadcasts a proxy register request so that another apparatus proxy-executes notification processing of a service provided by itself (step S602). Upon receiving the proxy register request, the NAN 101 enables its proxy function (step S603). The NAN 101 registers, as service information to be proxy-transmitted, the service information of the NAN 103 contained in the proxy register request. The NAN 101 executes the DW setting control processing shown in FIG. 4 (step S604). In this case, the NAN 101 accepts the proxy register request, and shifts to a state in which wireless signals are received during all the DW periods in accordance with the flowchart shown in FIG. 4. The NAN 101 transmits a proxy register response message to notify the NAN 103 that it has accepted the proxy register request (step S605). This message is a response signal to the proxy register request message received in step S602, and may be transmitted before the processes in steps S603 and S604. If the NAN 103 receives the proxy register response message, and confirms that the proxy request has been accepted, it can reduce a number of the periods during which a wireless signal is received, thereby further reducing the power consumption.

After the end of DW0, a NAN 104 is activated by the user (not shown) of itself (step S606). The NAN 104 receives a discovery beacon (not shown) from the NAN 102, and joins the NAN cluster 105.

When a period of 512 TUs elapses after the start timing of DW0, DW1 starts. During DW1, the NAN 102 transmits a sync beacon to send a notification that the DW period starts (step S607). Upon receiving the sync beacon, the NAN 104 recognizes the DW period, and transmits a subscribe message to discover a predetermined service (step S608). In this example, the subscribe message is a message for searching for the service provided by the NAN 103, and the service is a service for which the NAN 103 has requested, in step S602, the NAN 101 to perform proxy transmission.

Upon receiving the subscribe message from the NAN 104, the NAN 101 notifies the NAN 104 that the NAN 103 has the service since the service for which the NAN 101 has accepted the proxy request from the NAN 103 exists (step S609). This notification is performed by a predetermined message (for example, a proxy publish message). Note that the notification transmitted in step S609 contains identification information of the NAN 103 and that of the service. This allows the NAN 104 to know that the NAN 103 has the service which the NAN 104 is searching for. At this time, if the NAN 101 performs control to receive a wireless signal during only DWn where n is a multiple of 4, it cannot receive the message in step S608 during DW1 to DW3. This may delay the timing at which the NAN 104 discovers the service. However, since the NAN 101 according to this embodiment currently operates in the state in which it receives wireless signals during all the DWs by the processing shown in FIG. 4, it can receive the message in step S608 during DW1 to DW3 and the like. Therefore, according to this embodiment, the NAN 104 can quickly discover the desired service.

Figure 7:
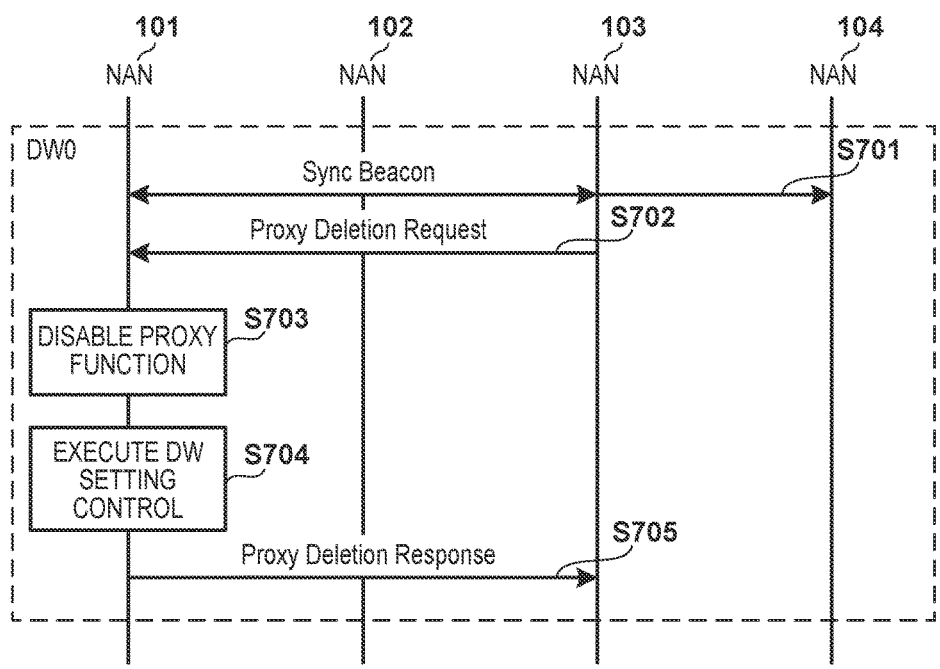
FIG. 7 is a sequence chart showing the first example of the procedure of proxy request stop processing.

A sequence when the NAN 101 receives a proxy deletion request will be described with reference to FIG. 7. At the start of the processing shown in FIG. 7, the NAN 101 has accepted the request of proxy transmission of the service of the NAN 103 and currently operates as the proxy server, as described with reference to FIG. 6.

During DW0, the NAN 102 broadcasts a sync beacon to notify another apparatus of the DW period (step S701). During this DW period, the NAN 103 transmits a proxy deletion request to the NAN 101 (step S702). Upon receiving the proxy deletion request, the NAN 101 stops the operation as the proxy server since there is no other NAN device or service for which proxy transmission has been requested (step S703). The NAN 101 executes the DW setting control processing shown in FIG. 4 (step S704). In this case, since there is no service information to be proxy-transmitted, the NAN 101 makes a setting to receive a wireless signal during only DWn where n is a multiple of 4 in accordance with the flowchart shown in FIG. 4. After that, the NAN 101 transmits a proxy deletion response message to notify the NAN 103 that it has accepted the proxy deletion request (step S705). This message is a response signal to the proxy deletion request message received in step S702, and may be transmitted before the processes in steps S703 and S704. Note that a case in which when the proxy deletion request is received, the NAN 101 stops the proxy transmission of the service information of the transmission source of the request has been explained. The trigger to stop the proxy transmission is not limited to this. For example, when a predetermined period (for example, 10 min) elapses after the proxy transmission of the service information is requested, the NAN 101 may automatically stops the proxy transmission of the service information. Alternatively, if the NAN 101 cannot communicate with the proxy client as the request source of the proxy transmission of the service information for a predetermined period (for example, 5 min) or more, it may stop the proxy transmission of the service information of the proxy client.

As described above, according to this embodiment, the communication apparatus (NAN 101) is allowed to receive wireless signals during all the DWs when a proxy request is accepted. This allows the communication apparatus operating as the proxy server to increase the probability that it can receive the subscribe message from the first apparatus. As a result, since the communication apparatus can proxy-transmit the publish message as a proxy for the second apparatus for providing a service, the probability that another apparatus can quickly discover the service can be increased. On the other hand, if the communication apparatus has not accepted a proxy request, wireless signals can be received during only some of DWs instead of all the DWs, thereby reducing the power consumption.

In this embodiment, if the NAN 101 does not currently operate as the proxy server in step S403 of FIG. 4, it can receive a wireless signal during DWn where n is a multiple of 4. The present invention, however, is not limited to this. For example, the NAN 101 may be able to receive a wireless signal during DWn where n is a multiple of 2. If the NAN 101 does not currently operate as the proxy server, it may be able to receive wireless signals during all the DW periods. Note that it is important to allow the NAN 101 to receive wireless signals during all the DW periods when the NAN 101 operates as the proxy server of another NAN device. Therefore, if the NAN 101 has enough power, it need not enter the DOZE state even when it does not operate as the proxy server. Furthermore, even if the NAN 101 currently operates as the proxy server, it may be able to receive wireless signals during only some of the DW periods. For example, if the NAN 101 currently operates as the proxy server, the frequency at which the NAN 101 can receive wireless signals during the DW periods may be increased, as compared with the other case. For example, the NAN 101 may control to receive a wireless signal during DWn where n is a multiple of 2 in step S402 instead of controlling to receive wireless signals during all the DWs, and control to receive a wireless signal during DWn where n is a multiple of 4 in step S403. In this case, as compared with a case in which no DW setting control is performed after accepting the proxy request, the appearance frequency of DW periods during which the NAN 101 can receive wireless signals is set twice, and thus the service can be discovered within half the time on average. This makes it possible to suppress the power consumption to some extent when the NAN 101 operates as the proxy server while increasing the probability that the NAN 101 can respond to a service discovery request from another apparatus.

During a period when a NAN device joining a NAN cluster may transmit a publish or subscribe message, the proxy server can receive a wireless signal. Thus, if a service request is transmitted, the proxy server can receive it, and quickly return a response. That is, it is possible to prevent a situation in which if an apparatus currently requesting a service transmits a subscribe message during a DW period, the proxy server cannot receive it since it is not receiving a wireless signal, and thus cannot discover the service. Similarly, it is possible to prevent a situation in which an apparatus currently requesting a service retransmits the subscribe message during the next DW, and thus the time taken to discover the service is prolonged and the wireless resources are wasted by the retransmitted message.

<Second Embodiment>

In this embodiment, in DW setting control processing, a NAN 101 decides a master preference in a NAN cluster. The master preference is a parameter corresponding to the possibility of playing each of the master, non-master sync, and non-master non-sync roles in the NAN cluster. That is, the master preference is a value used to decide an apparatus having a role of transmitting a sync beacon. An apparatus having a larger master preference readily operates in the master role. The difference from the first embodiment will be mainly described below.

Figure 8:
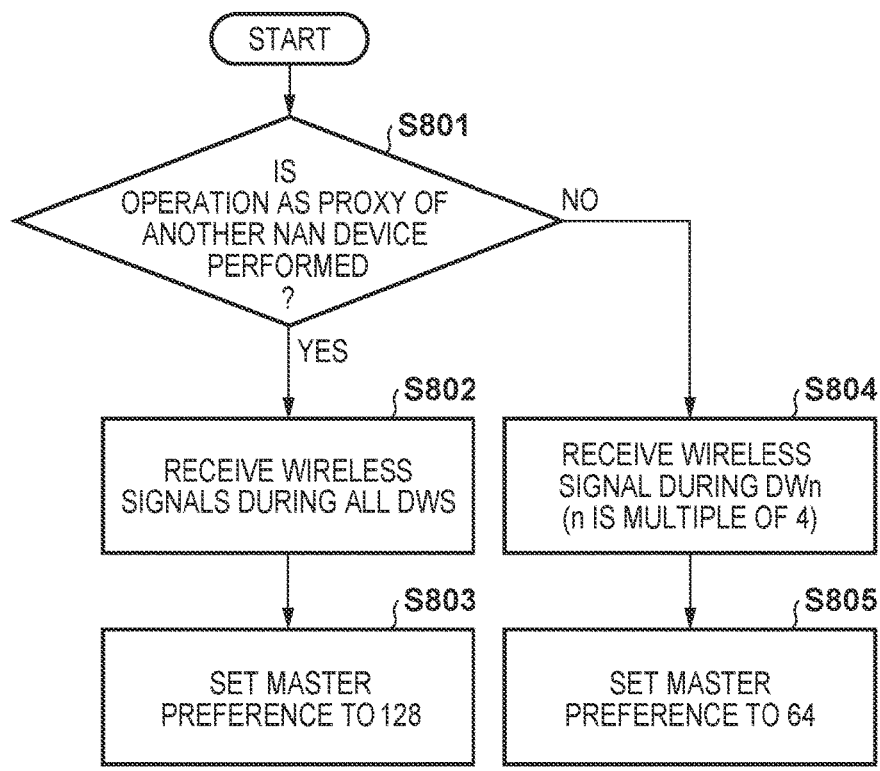
FIG. 8 is a flowchart illustrating the second example of the procedure of DW setting control processing.

FIG. 8 shows an example of the procedure of DW setting control processing according to this embodiment. In this embodiment as well, the NAN 101 executes this processing when it receives a proxy register request or proxy deletion request from another apparatus (NAN device) joining a NAN cluster 105. Processes in steps S801, S802, and S804 are the same as those in steps S401, S402, and S403, respectively, and a detailed description thereof will be omitted.

If it is determined that the NAN 101 operates as the proxy server which proxy-transmits the service information of the other communication apparatus in step S802 (YES in step S801), the NAN 101 sets the master preference to 128 (step S803). In the NAN standard, the master preference having a value of 128 or more indicates that a NAN device having the value is a NAN infrastructure device having the capability of continuously operating in the master role. On the other hand, if it is determined that the NAN 101 does not operate as the proxy server, that is, the NAN 101 proxy-transmits no service information of the other communication apparatus (NO in step S801), the NAN 101 sets the master preference to 64 (step S805).

With the processing shown in FIG. 8, if the NAN 101 operates as the proxy server, it becomes relatively easy for the NAN 101 to operate in the master or non-master sync role. Alternatively, if the NAN 101 does not operate as the proxy server, it becomes relatively difficult for the NAN 101 to operate in the master or non-master sync role.

If the NAN 101 operates as the proxy server, it can receive wireless signals during all DW periods regardless of the relationship of the master preference with nearby NAN devices. The NAN 101 sets the master preference so as to readily operate in the master role, and makes it difficult for other NAN devices to operate in the master role, thereby reducing the power consumption of other NAN devices. On the other hand, since the NAN 101 operates in the master role to transmit a sync beacon or discovery beacon, the power consumption of the NAN 101 increases but the power consumption related to reception remains unchanged. The above-described processing can reduce the power consumption in the whole NAN cluster. On the other hand, if the NAN 101 does not operate as the proxy server, the necessity to receive wireless signals during many DW periods becomes low. The NAN 101 can reduce its power consumption by setting the value of the master preference so that it becomes difficult for the NAN 101 to operate in the master role.

<Third Embodiment>

This embodiment will describe a case in which the user can set enabling/disabling of the proxy function of his/her NAN device. The NAN device changes DWs for receiving wireless signals in accordance with the setting of enabling/disabling of the proxy function set by the user. For example, when the user prevents his/her NAN device from operating as the proxy server, it is possible to reduce the power consumption of the NAN device. The difference from the above-described embodiments will be mainly described below.

Figure 9:
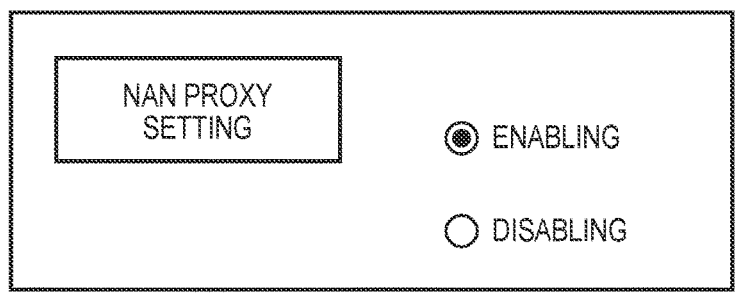
FIG. 9 is a view showing an example of a setting UI for setting enabling/disabling of a proxy function.

FIG. 9 shows an example of an image displayed on the screen of a NAN 101 by a UI control unit 305. The user of the NAN 101 can enable or disable the proxy function of the NAN 101 via the UI shown in FIG. 9. If the user enables the proxy function, the NAN 101 can operate as the proxy server of another apparatus; otherwise, the NAN 101 is prevented from operating as the proxy server of the other apparatus.

Figure 10:
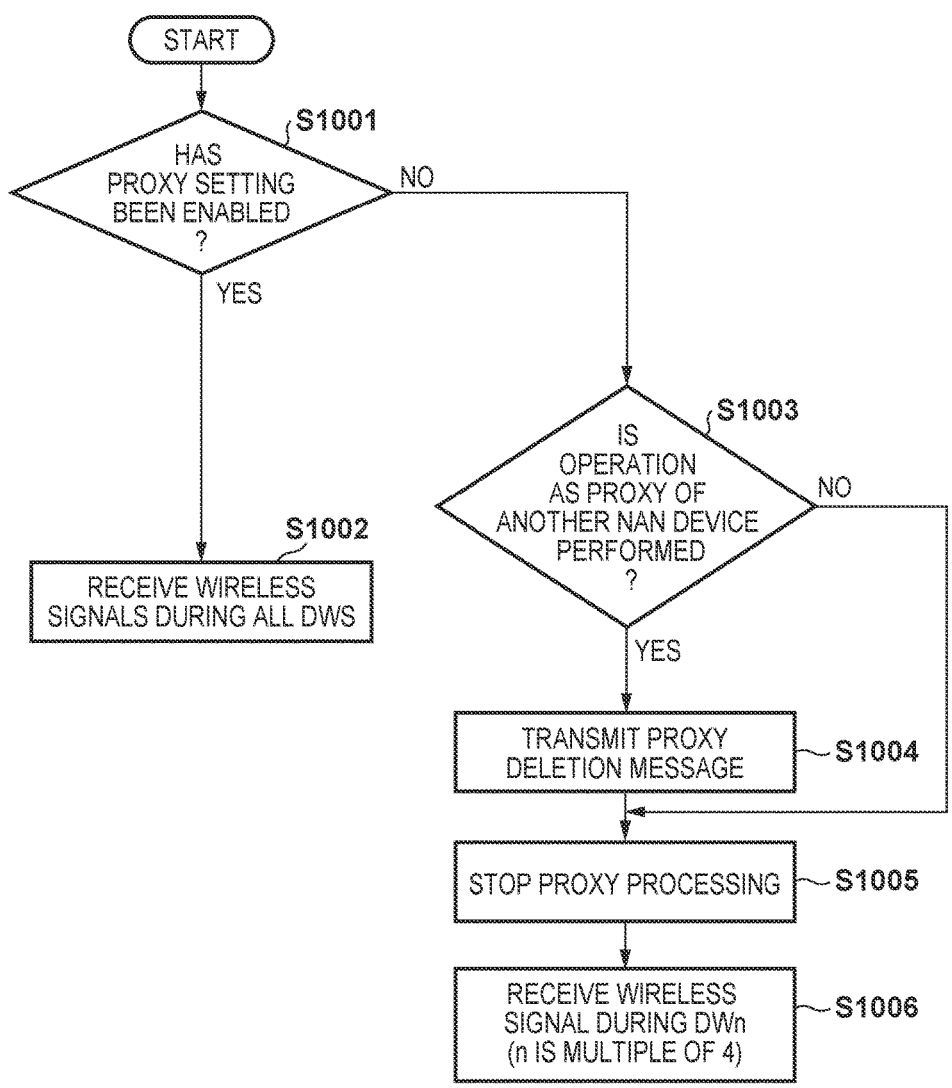
FIG. 10 is a flowchart illustrating the third example of the procedure of DW setting control processing.

FIG. 10 shows an example of the procedure of DW setting control processing according to this embodiment. This processing is executed when the user switches the setting of the proxy function between enabling and disabling via the UI. First, the NAN 101 determines whether its proxy function has been enabled (step S1001). At this time, if the proxy function has been enabled (YES in step S1001), the NAN 101 performs control to be able to receive wireless signals during all DW periods (step S1002).

On the other hand, if the proxy function has been disabled (NO in step S1001), the NAN 101 determines whether it operates as the proxy server for proxy-transmitting the service information of another NAN device (step S1003).

If the NAN 101 operates as the proxy server for proxy-transmitting the service information of the other NAN device (YES in step S1003), it transmits a proxy deletion message (step S1004). Note that the proxy deletion message is transmitted in a DW period in which the proxy client can receive a wireless signal. That is, even if the NAN 101 should transmit the proxy deletion message, it waits for transmission of the proxy deletion message until the next DW period in which the proxy client can receive a wireless signal. Note that if the timing at which it is determined that the NAN 101 should transmit the proxy deletion message falls within the DW period in which the proxy client can receive a wireless signal, the NAN 101 may immediately transmit the proxy deletion message in the DW period.

After that, the NAN 101 transmits the proxy deletion message to all proxy clients which have requested the NAN 101 to proxy-transmit service information, and then stops the processing of the proxy server (step S1005). The NAN 101 performs control to receive a wireless signal during the period of DWn where n is a multiple of 4 (step S1006). Note that if the NAN 101 does not operate as the proxy server for proxy-transmitting the service information of the other NAN device (NO in step S1003), the processes in steps S1005 and S1006 are executed without transmitting the proxy deletion message.

A sequence when the NAN 101 receives a proxy register request according to this embodiment will be described with reference to FIG. 11. Note that at the start of the processing shown in FIG. 10, the proxy function of the NAN 101 has been disabled by the user of the NAN 101. Thus, the NAN 101 has received no request of proxy transmission of the service information of another NAN device, and can receive a wireless signal during the period of DWn where n is a multiple of 4.

Processes in steps S1101 and S1102 are the same as those in steps S601 and S602 of FIG. 6, respectively. Note that since the proxy function of the NAN 101 has been disabled at this time, none of the processes in steps S603 to S605 is executed.

After that, the user of the NAN 101 enables the proxy function of the NAN 101 via the UI (step S1103). Then, in accordance with the flowchart shown in FIG. 10, the NAN 101 enables the proxy function (step S1104), and executes DW setting control (step S1105), thereby entering a state in which the NAN 101 can receive wireless signals during all the DW periods.

Processing in step S1106 is the same as that in step S607 of FIG. 6. During DW1, a NAN 103 retransmits the same message as in step S1102. That is, the NAN 103 retransmits the proxy register request (step S1107). At this time, the NAN 101 can receive a wireless signal during DW1 and the proxy function is in the enable state. Thus, upon receiving the proxy register request, the NAN 101 transmits a proxy register response message (step S1108). This causes the NAN 101 to execute proxy processing of the NAN 103. As in step S609 of FIG. 6, if another apparatus (a NAN 104) searches for a service provided by the NAN 103, the NAN 101 can transmit a response message instead of the NAN 103.

A sequence when the user disables the proxy function of the NAN 101 will be described with reference to FIG. 12. The following description assumes that the NAN 101 has accepted a proxy request for the service of the NAN 103, as shown in FIG. 11. In this example, a case in which the proxy function of the NAN 101 is disabled during the period of DW15 will be explained. Assume also that the NAN 103 can receive a wireless signal during only the period of DW0.

During the period of DW15, the user of the NAN 101 disables the proxy function of the NAN 101 (step S1201). During the period of DW15, the NAN 103 can receive no wireless signal. Therefore, at this time, the NAN 101 does not transmit a proxy deletion message yet. On the other hand, a NAN 102 broadcasts a sync beacon to notify another apparatus of the DW period (step S1202).

During the period of DW15, the NAN 104 transmits a subscribe message for discovering a predetermined service provided by the NAN 103 (step S1203). In this case, since the NAN 101 has not transmitted a proxy deletion message to the NAN 103 yet, the NAN 101 continues the operation as the proxy server. That is, as in step S609 of FIG. 6, the NAN 101 transmits a proxy publish message (step S1204).

After that, when the period of DW15 ends and DW0 as the next DW period starts, the NAN 102 transmits the sync beacon (step S1205). During the period of DW0, the NAN 103 can receive a wireless signal. Thus, the NAN 101 transmits a proxy deletion message during this period (step S1206). This message is a message for notifying the NAN 103 that the NAN 101 is to stop the proxy function. After transmitting the proxy deletion message, the NAN 101 stops the operation as the proxy server in accordance with the flowchart shown in FIG. 10 (step S1207), and sets only the period of DWn where n is a multiple of 4 as a DW period during which a wireless signal is received.

In this embodiment, instead of immediately stopping the operation as the proxy server when the user disables the proxy setting, the NAN 101 first notifies the NAN client, which has requested proxy execution, that it stops the proxy function. After the notification, the NAN 101 stops the operation as the proxy server. This prevents a state in which the NAN client cannot know that the NAN 101 has stopped the operation as the proxy server. In this case, when the NAN 101 stops the operation as the proxy server, the NAN client can quickly notify a nearby NAN device of the service provided by itself by increasing the number of DW periods during which wireless signals can be received. The NAN client can also request another proxy server to execute proxy processing as the proxy server.

In this embodiment, control is performed to change DW periods, during which wireless signals are received, by explicitly setting enabling/disabling of the proxy function of the NAN 101 by the user. However, setting of enabling/disabling of the proxy function is not limited to explicit setting by the user, and can be automatically or manually made by another method. For example, if power is supplied by a stable power supply, the NAN 101 may enable the proxy function. On the other hand, if power is supplied by an unstable power supply, for example, if power is supplied by a battery, the NAN 101 may disable the proxy function. Furthermore, if the remaining battery level is higher than a predetermined level, the NAN 101 may enable the proxy function; otherwise, the NAN 101 may disable the proxy function. If the NAN 101 searches for nearby NAN devices, and there exist a number of NAN devices in each of which the proxy function is in the enable state, the NAN 101 may disable its proxy function. In this case, if there exist a small number of NAN devices in each of which the proxy function is enabled or there are no such NAN devices, the NAN 101 may enable its proxy function.

<Other Embodiments>

In the above-described embodiments, a case in which the NAN 101 operates as the proxy server which proxy-responds to a notification of the service provided by the NAN 103 has been described. However, data to be proxy-transmitted by the proxy function is not limited to the information of the service which can be provided. For example, the NAN 101 may accept a service search request by another apparatus, and search for a service instead of the apparatus. In this case, for example, the NAN 101 can search for the service by proxy-transmitting a subscribe message by the other apparatus, and receiving a publish message as a response to that message. Note that the NAN 101 may wait for a publish message transmitted (for example, voluntarily) by still another apparatus without transmitting a subscribe message. In either case, the NAN 101 can notify the apparatus, which has requested to proxy-execute the service search processing, of the search result during a DW period when the apparatus can receive a wireless signal.

Furthermore, in the above-described embodiments, the NAN 101 accepts the proxy request from the NAN 103. However, the NAN 101 may accept a proxy request from one or more other NAN devices. In this case, for example, in the processing shown in FIG. 4, if the NAN 101 accepts proxy processing from at least one NAN device, the NAN 101 can be set in the state in which it can receive wireless signals during all the DW periods. Furthermore, if the NAN 101 operates as the proxy server for one or more other apparatuses, it may change the appearance frequency of DW periods, during which it can receive wireless signals, in accordance with the number of apparatuses. That is, the NAN 101 may set the number of DW periods of the 16 DW periods included in one cycle, during which wireless signals can be received. For example, if the NAN 101 operates as the proxy server for one apparatus, it can receive a wireless signal during only the period of DWn where n is a multiple of 4. If the NAN 101 operates as the proxy server for two apparatuses, it can receive a wireless signal during the period of DWn where n is a multiple of 2.

According to the present invention, it is possible to shorten the period until a communication apparatus discovers another apparatus and a service provided by it.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-187445, filed Sep. 24, 2015 which is hereby incorporated by reference herein in its entirety.

What is claimed is:

1. A communication apparatus comprising:
   at least one processor; and
   at least one memory storing code to be executed by the at least one processor, wherein the at least one processor executes the code to function as:
      a communication unit configured to transmit/receive a wireless signal to/from another communication apparatus during a period of a predetermined length which comes at a predetermined time interval;
      an execution unit configured to execute at least one of transmission processing and reception processing of the wireless signal during the period as a proxy of another apparatus; and
      a setting unit configured to set, in accordance with whether the execution unit executes the processing, a frequency at which the communication apparatus enters in a state in which the communication unit transmits/receives the wireless signal during the periods, wherein the setting unit sets the frequency when the execution unit executes the processing higher than that when the execution unit does not execute the processing.

2. The apparatus according to claim 1, wherein if the execution unit executes the processing, the setting unit sets the frequency so that the communication apparatus enters in the state in which the communication unit transmits/receives the wireless signal during all the periods.

3. The apparatus according to claim 1, further comprising:
an acceptance unit configured to accept a user setting for enabling or disabling the processing by the execution unit,
wherein the setting unit sets the frequency when the user setting for enabling the processing by the execution unit has been accepted higher than that when the user setting for disabling the processing by the execution unit has been accepted.

4. The apparatus according to claim 3, wherein when the user setting for disabling the processing by the execution unit is accepted, if the execution unit is executing the processing as the proxy of the other apparatus, the communication unit transmits a message to notify the other apparatus that the processing is to be stopped, and the execution unit stops the execution of the processing.

5. The apparatus according to claim 4, wherein
the communication unit transmits the message during the period when the other apparatus receives the wireless signal, and
the execution unit stops the execution of the processing after the message is transmitted to the other apparatus.

6. The apparatus according to claim 1, wherein if the execution unit is executing the processing as a proxy of at least one other apparatus, the setting unit sets the frequency in accordance with the number of other apparatuses.

7. The apparatus according to claim 6, wherein the setting unit sets the frequency higher as the number is larger.

8. The apparatus according to claim 1, wherein the wireless signal includes a signal indicating a service provided by another communication apparatus.

9. The apparatus according to claim 1, wherein the wireless signal includes a signal for searching for the service provided by another communication apparatus.

10. The apparatus according to claim 1, wherein the period comprises a period of a discovery window of Wi-Fi Alliance Neighbor Awareness Networking.

11. The apparatus according to claim 1, further comprising:
a decision unit configured to decide, in accordance with whether the execution unit executes the processing, a value to be used to decide an apparatus for transmitting a beacon during the period.

12. A control method for a communication apparatus which transmits/receives a wireless signal to/from another communication apparatus during a period of a predetermined length which comes at a predetermined time interval, and has a capability of executing at least one of transmission processing and reception processing of the wireless signal during the period as a proxy of another apparatus, the method comprising:
setting, in accordance with whether the communication apparatus executes the processing, a frequency at which the communication apparatus enters in a state in which the communication apparatus transmits/receives the wireless signal during the periods,
wherein the frequency when the communication apparatus executes the processing is set higher than that when the communication apparatus does not execute the processing.

13. A non-transitory computer-readable storage medium storing a computer program for causing a computer of a communication apparatus, which transmits/receives a wireless signal to/from another communication apparatus during a period of a predetermined length which comes at a predetermined time interval, and has a capability of executing at least one of transmission processing and reception processing of the wireless signal during the period as a proxy of another apparatus, to execute:
setting, in accordance with whether the communication apparatus executes the processing, a frequency at which the communication apparatus enters in a state in which the communication apparatus transmits/receives the wireless signal during the periods,
wherein the frequency when the communication apparatus executes the processing is set higher than that when the communication apparatus does not execute the processing.

14. A communication apparatus comprising:
at least one processor; and
at least one memory storing code to be executed by the at least one processor, wherein the at least one processor executes the code to function as:
a communication unit configured to communicate service information during discovery windows of Neighbor Awareness Networking;
an execution unit configured to execute processing of proxy-transmitting service information of another apparatus during the discovery windows; and
a setting unit configured to set the communication unit during the discovery windows so that a frequency, when the execution unit does not execute the processing, at which the communication unit is set in a state in which no wireless communication is performed during the discovery windows is lower than that, when the execution unit executes the processing, at which the communication unit is set in the state in which no wireless communication is performed during the discovery windows.

15. The apparatus according to claim 14, wherein the setting unit sets a frequency, when the execution unit executes the processing, at which the communication apparatus enters in a state in which the communication unit transmits/receives a wireless signal during the discovery windows higher than that, when the execution unit does not execute the processing, at which the communication apparatus enters in a state in which the communication unit can transmit/receive the wireless signal during the discovery windows.

* * * * *